United States Patent [19]

Ferguson

[11] 4,265,383
[45] May 5, 1981

[54] SLAT ASSEMBLY

[75] Inventor: Douglas J. Ferguson, Davisburg, Mich.

[73] Assignee: Four Star Corporation, Troy, Mich.

[21] Appl. No.: 33,882

[22] Filed: Apr. 27, 1979

[51] Int. Cl.³ .............................................. B60R 9/04
[52] U.S. Cl. .................................... 224/326; 52/718; 293/1
[58] Field of Search ............... 224/309, 315, 322, 323, 224/324, 325, 326; 293/126–128, 1; 52/716–718

[56] References Cited

U.S. PATENT DOCUMENTS

| 3,487,420 | 12/1969 | Herr et al. | 52/718 X |
| 3,519,179 | 7/1970 | Stephen | 224/326 |
| 3,572,799 | 3/1971 | Truesdell et al. | 52/718 X |
| 3,606,432 | 9/1971 | Honatzis | 52/716 X |
| 3,606,433 | 9/1971 | Konevicius | 52/718 X |
| 3,615,069 | 10/1971 | Bott | 224/309 X |
| 3,951,320 | 4/1976 | Bott | 52/716 X |
| 3,991,537 | 11/1976 | Brown | 52/717 |
| 4,015,760 | 4/1977 | Bott | 224/326 X |
| 4,055,285 | 10/1977 | Bott | 224/326 |

FOREIGN PATENT DOCUMENTS 681156  3/1964  Canada .................................... 224/325

Primary Examiner—Stephan Marcus
Attorney, Agent, or Firm—Reising, Ethington, Barnard, Perry & Brooks

[57] ABSTRACT

A slat assembly for automobile luggage racks comprises a slat and a mounting pad and is provided at each end with an endcap. The slat and mounting pad are configured to interengage securely. The slat comprises an extruded member forming an upper, partially dovetailed central channel, and two parallel, downwardly open channels. The mounting pad is formed from a non-corroding material and is provided with mounting flanges for interengaging with the downwardly open channels of the slat. The slat assembly may further comprise a rub strip, contoured to nest securely within the central channel of the slat.

6 Claims, 3 Drawing Figures

SLAT ASSEMBLY

BACKGROUND OF THE INVENTION

I. Field of the Invention

The present invention pertains to automobile luggage racks. More particularly, the present invention pertains to slat assemblies for automobile luggage racks. Even more particularly, the present invention pertains to slat assemblies for automobile luggage racks comprising interengaging members.

II. Description of the Prior Art

Luggage racks for automotive vehicles are generally provided with a plurality of slat assemblies which are mounted to a vehicle surface. The slat assembly seats cargo carried on the luggage rack to protect the surface of the vehicle from scratching or other damage resulting from direct contact therewith.

Slat assemblies known in the prior art generally comprise a rigid, metal slat and a mounting pad. The pad is, ordinarily, constructed from a durable, non-corroding material, which is interposed between the slat and the vehicle surface to prevent corrosion or galvanic welding between, also, the pad protects the vehicle surface from scratching due to contact with the metal slat. Known slat assemblies further comprise end caps which are journalled onto the ends of the slat. Also, prior art slat assemblies are, generally, provided with rub strips which are deployed on the upper portion of the slat to protect the metal from scratching and to provide a non-slip surface for supporting cargo.

Generally, the slat is seated on a mounting pad and is secured thereto by means, such as screws which extend through the slat and mounting pad to mount the assembly to the automobile surface. However, known slat assemblies are, generally, extruded or die cast members, having configurations wherein the weight of the cargo tends to collapse the side walls thereof. This forces the slat away from the mounting pad and onto the vehicle surface resulting in scratching or other damage.

Accordingly, substantial benefits would be achieved by providing a slat assembly wherein the slat and mounting pad are interengaging to prevent the slat from contacting a vehicle surface.

Further benefits would be obtained by providing a slat assembly wherein the ends of the slat extend above the vehicle surface to facilitate the mounting of end caps to the assembled slat structure.

III. Prior Art Statement

In the opinion of the Applicant, U.S. Pat. No. 4,015,760 constitutes the most revelant prior art of which the Applicant is aware.

SUMMARY OF THE INVENTION

The present invention which will be described subsequently in greater detail comprises a slat assembly for automobile luggage racks, defined by an interengagable slat and mounting pad.

The slat hereof comprises a metal extrusion having upwardly converging walls, which cooperate with a base portion extending therebetween to define a partially dove-tailed central channel. An arcuate, outwardly directed arm extends from each wall. The arms are substantially similar and each defines a channel which is downwardly directed.

The mounting pad hereof is constructed from a durable non-corrosive material such as plastic or rubber and comprises a pair of upwardly diverging walls connected by a base portion which extends therebetween. An upwardly extending mounting flange is provided on each side of the base and is longitudinally coextensive therewith.

The slat and the mounting pad are dimensioned such that the flanges and base of the mounting pad cooperate to form a seat dimensioned to receive and engage the slat. The mounting flanges of the mounting pad extend into the downwardly directed channels of the slat defined by the arms.

The slat assembly hereof may be further provided with a rub strip, dimensioned to be received securely in the partially dove-tailed central channel of the metal slat. End caps are journalled onto the ends of the slat structure to enclose same.

It is therefore a primary object of the present invention to provide a slat assembly for automoible luggage racks which comprises interengagable components which are not susceptible to structural weakening under the weight of cargo.

It is a further object of the present invention to provide a slat assembly for an automoible lugggage rack which is easily assembled, aesthetically pleasing, and which provides maximum protection to the vehicle surface.

Other advantages and applications of the present invention will become apparent when the following description is read in conjunction with the accompanying drawings.

BRIEF DESCRIPTION OF THE DRAWINGS

The description herein makes reference to the accompanying drawings wherein like reference numerals refer to like parts throughout several views in which.

DESCRIPTION OF THE PREFERRED EMBODIMENT

Figure 1:
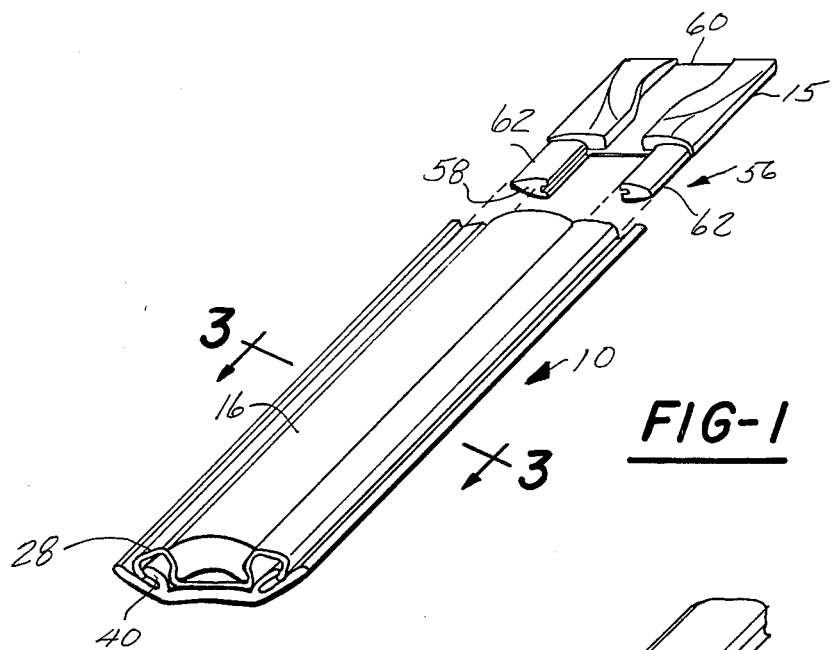
FIG. 1 is a perspective view of the slat assembly hereof.
Figure 2:
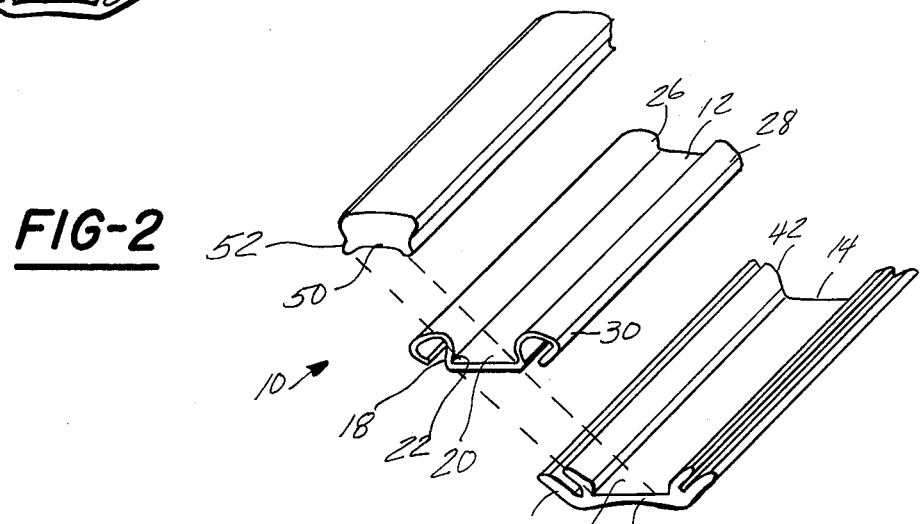
FIG. 2 is an exploded perspective view of the slat assembly hereof.
Figure 3:
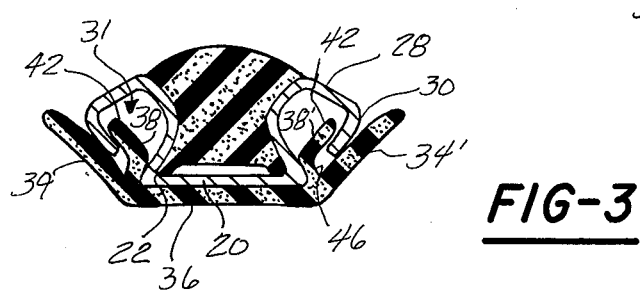
FIG. 3 is a cross sectional view of the slat assembly hereof taken along lines 3—3 of FIG. 1.

Now, and with reference to the drawing, there is depicted generally at 10 a slat assembly for an automobile luggage rack comprising a slat 12 and a mounting pad 14. The slat assembly is shown with a rub strip 16 mounted therein. End caps 15 (only one of which is shown) are journalled onto each end of the slat 12. As best seen in FIGS. 2–3, the slat 12 and mounting pad 14 are interengagable and interlocking members which cooperate to define the slat assembly hereof.

The slat hereof comprises a unitary, metal extrusion having inwardly converging side walls 18 which are interconnected by a base 20. The junction of the base 20 and the converging side walls 18 are defined by arcuate sections which define arcuate inner channels 22. An outwardly extending arm is integrally formed with each sidewall 18. As illustrated in the drawing, each arm comprises first and second sections which cooperate to define means for interengaging with the mounting pad 14. In a preferred embodiment hereof, each first section is defined by an outwardly curved section 26. Each second section is defined by a downwardly sloping, diverging leg 28, which depends from the curved section 26. Preferably, a third, inwardly sloping leg 30 is integrally formed with and extends from the diverging leg 28. The sections 26, and 28 cooperate with the leg 30 to define a downwardly open channel 31.

As shown in the drawing, the channels 31 are parallel and longitudinally extend along the length of the slat 12.

The mounting pad 14 is complementary to the slat 12 and interengages therewith. The pad 14 comprises a pair of outwardly diverging side walls 34, 34' which are interconnected by a central base portion 36. A pair of opposed mounting flanges 38, 38' are formed integrally with the mounting pad 14. The flanges are disposed at the interconnection of the side walls 34 and the base 36. The flanges are longitudinally co-extensive with the base 36 and the walls 34, 34'.

Each mounting flange 38 is defined by a first, upstanding leg 40 and a second, diverging leg 42 which is substantially parallel to the adjacent side wall 34. The mounting flanges 38 cooperate with the mounting pad base 36 to define an upwardly directed, dove-tailed central channel 44. The second legs 42 of the mounting flanges and the mounting pad side walls 34, 34' cooperate to define a narrow, angular and upwardly open channel 46 therebetween.

The base 20 of the slat 12 is configured to nest snuggly within the central channel 44 of the mounting pad 14. When the slat 12 is properly emplaced on the mounting pad 14, the base 20 of the slat is seated upon the base 36 of the mounting pad, between upstanding legs 42 of the mounting flanges 38. The diverging legs 42 of the mounting flanges 38 are received in the downwardly opened channels 26 of the slat 12. Concommitantly, the inwardly sloping legs 30 of the parallel channel 31 are received within the channels 46 provided on the mounting pad 14. In this manner, the slat 12 is mounted interengagingly on the mounting pad 14.

The present slat assembly is adapted to receive therewithin a rub strip 16. The rub strip 16 is constructed from a suitably resilient material such as rubber. The rub strip 16 enhances the aesthetic appeal of the slat assembly and protects the slat from scratching. Preferably, the rub strip 16 is constructed from a material having a high coefficient of friction, to provide a secure, non-slip seat for the cargo.

As best illustrated in FIG. 3, the rub strip 16 is adapted to nest securely within the partially dove-tailed central channel 24 of the slat 12. The rub strip 16 is provided with arcuate side walls 48 which are dimensioned to conform with the interior structure of the slat 12, as shown. The rub strip 16 is further provided with a raised base portion 50, the side walls 48 terminating in outwardly extending feet 52 on which the base 50 is supported. The feet 52 of the rub strip 16 are dimensioned to fit securely into inner channels 22 of the slat 14, abutting the base 20. In this manner, the rub strip is mounted securely within the slat 12, supported by the base 20 and side walls 18 thereof.

In the preferred method of assembly, the slat 12 is nested into the mounting pad 14 such that the respective bases of the slat 12 and mounting pad 14 are abutting and such that the downwardly inclined legs 30 of the slat 12 are nested within the upper channels 44 of the mounting pad, and the upper legs 42 of the mounting flanges 38, within the parallel channels 31 of the slat 12.

The end caps 15 are provided to enclose the ends of the slat assembly 10.

The end caps 15 generally comprise unitary members configured to be journalled onto the ends of the slat assemblies. The end caps 15 comprise a base portion 54 and slat mounting means 56 disposed at a first, slat engaging end 58 thereof. The end caps 15 are preferably provided with a sloping configuration such that the second ends 60 thereof are substantially shorter than the slat engaging ends 58 to minimize the wind resistance of the slat assembly.

In the preferred embodiment, the slat mounting means 56 comprises a pair of spaced apart, parallel, projection prongs 62 which are complementary to the parallel, downwardly open channels 31 of the slat 14. Thus, the end caps 15 are mounted to the slat assembly 10 by journalling the prongs 60 of the end caps 15 into the downwardly open channels 30 of the slat 14. The upper legs 32 of the mounting pad flanges 38, nested within the slat channels 30, in the completed assembly, closely abut the prongs 60 within the channels 31 to insure that the prongs 60 are retained tightly and securely therewithin.

The slat assembly may be mounted to a vehicle surface by conventional mounting means such as screws through mounting apertures (not shown) provided in the base 20 of the slat 12. The end caps may then be journalled to the ends of the slat assembly and mounted to the surface of the automobile in the conventional manner.

The rub strip 16 may then be emplaced within the slat, by aligning the rub strip with the dove-tailed central channel of the slat and exerting downward pressure on the rub strip to force it into position, nested within the central channel 24 of the slat 12.

It is to be appreciated from the preceding that there has been disclosed herein an interengaging slat assembly for automobile luggage racks. The present invention is amenable to modifications and changes all falling into the scope of the present invention.

Having thus described the invention, what is claimed is:

1. A slat assembly for an automobile luggage rack comprising:
   a slat,
   a mounting pad, the mounting pad being configured to nestingly receive the slat,
   the slat comprising an elongated member, and including channel means for interengaging said mounting pad,
   said pad comprising:
      a base,
      a pair of spaced apart, upwardly diverging side walls extending upwardly from the extending base,
      a pair of spaced apart mounting flanges extending upwardly from the base, the flanges comprising means for interengaging the slat.

2. The slat assembly of claim 1 wherein the mounting flanges cooperate with the mounting pad base to define a seat for nestingly receiving the slat.

3. The slat assembly of claim 1 wherein:
   (a) the slat comprises a base, a pair of upwardly extending, spaced apart walls extending upwardly from the base, an arcuate, laterally outwardly projection arm integrally formed with each wall, each arm defining a channel,
   (b) the mounting pad comprises a base, a pair of outwardly extending, spaced apart walls extending from the base, a pair of mounting flanges projecting upwardly from the base inwardly from the walls, and
wherein the mounting flanges project into the channels defined by the arms.

4. The slat assembly of claim 3 wherein the free end of each arm projects into the space between an associated mounting pad wall and mounting flange.

5. The slat assembly of claim 3 which further comprises:

an end cap, the end cap being journalled onto an end of the slat.

6. The slat assembly of claim 5 wherein the end cap comprises:
  a base portion, and
  a pair of spaced apart projecting prongs, each prong projecting into said slat channels.

* * * * *